United States Patent
Baeuerle et al.

(10) Patent No.: US 7,654,312 B2
(45) Date of Patent: Feb. 2, 2010

(54) HEATING AND/OR COOLING SYSTEM FOR A MOTOR VEHICLE

(75) Inventors: Michael Baeuerle, Ditzingen-Heimerdingen (DE); Klaus Ries-Mueller, Bad Rappenau (DE)

(73) Assignee: Robert Bosch GmbH, Stuttgart (DE)

( * ) Notice: Subject to any disclaimer, the term of this patent is extended or adjusted under 35 U.S.C. 154(b) by 763 days.

(21) Appl. No.: 11/302,816

(22) Filed: Dec. 14, 2005

(65) Prior Publication Data

US 2006/0130469 A1 Jun. 22, 2006

(30) Foreign Application Priority Data

Dec. 22, 2004 (DE) ............ 10 2004 061 809

(51) Int. Cl.
- *F25B 29/00* (2006.01)
- *B60H 1/00* (2006.01)
- *B60H 1/32* (2006.01)
- *B60H 3/00* (2006.01)

(52) U.S. Cl. ............... 165/202; 165/42; 165/43; 165/51; 165/52; 165/103; 165/297; 62/238.3; 62/476; 60/298; 60/320; 123/142.5 R; 237/12.3 A; 237/12.3 B

(58) Field of Classification Search ........ 165/202, 165/42, 43, 51, 52, 41, 103, 297; 62/238.3, 62/476; 60/298, 320; 123/142.5 R; 237/12.3 A, 237/12.3 B See application file for complete search history.

(56) References Cited

U.S. PATENT DOCUMENTS

| | | | | |
|---|---|---|---|---|
| 2,783,622 A | * | 3/1957 | Bourassa | 62/238.3 |
| 4,391,235 A | * | 7/1983 | Majkrzak | 123/142.5 R |
| 4,523,631 A | * | 6/1985 | McKinney | 165/43 |
| 5,934,073 A | * | 8/1999 | Gieshoff et al. | 60/320 |
| 6,330,910 B1 | * | 12/2001 | Bennett | 165/297 |
| 6,474,099 B2 | * | 11/2002 | Tanaka et al. | 62/480 |

FOREIGN PATENT DOCUMENTS

DE 100 05 490 8/2001

* cited by examiner

*Primary Examiner*—John K Ford
(74) *Attorney, Agent, or Firm*—Michael Best & Friedrich LLP

(57) ABSTRACT

The invention relates to a heating and/or cooling system (2) for a motor vehicle with a combustion engine (4) and a catalytic converter (8) arranged in the exhaust gas path (6) of the combustion engine (4), comprising a burner (10) attached before the catalytic converter (8) to the exhaust gas path (6) as well as a heat exchanger (12) for transmitting heat generated in the burner (10) to a heating and/or cooling circuit (28) of the motor vehicle. It is proposed that the heat exchanger (12) be arranged behind the catalytic converter (8) in the exhaust gas path (6) of the combustion engine (4) and can be acted upon through the catalytic converter (8) with hot combustion gases from the burner (10).

17 Claims, 2 Drawing Sheets

HEATING AND/OR COOLING SYSTEM FOR A MOTOR VEHICLE

BACKGROUND OF THE INVENTION

The invention relates to a heating and/or cooling system for a motor vehicle.

A heating system of this type is already known from DE 100 05 490 A1 of the applicant. In the case of the known heating system, the heat exchanger surrounds a combustion chamber of the burner and is attached to a coolant circuit of the combustion engine via a circulating pump so that before starting the combustion engine, in the case of low ambient temperatures, its coolant is heated by the burner and then can be supplied to the combustion engine and/or the heating heat exchanger of a heating system of the motor vehicle in order to preheat the combustion engine and/or as auxiliary heating to heat the vehicle passenger compartment or windows of the motor vehicle.

During the operation of the circulating pump, the hot combustion gases generated in the burner are cooled significantly by the heat exchange with the coolant of the combustion engine before they leave the combustion chamber and directed into the area of an exhaust gas manifold in the exhaust gas path of the combustion engine. In particular, when the motor vehicle has stood at low ambient temperatures for a longer period of time, the combustion gases cool down further at the cold exhaust gas manifold before they reach the catalytic converter. As a result, only a little heat is supplied to the catalytic converter so that it only heats up slowly. However, in order to maintain future exhaust gas limit values, quicker heating of the catalytic converter is required.

SUMMARY OF THE INVENTION

In contrast, the heating and/or cooling system in accordance with the invention offers the advantage that very quick heating of the catalytic converter is enabled since the combustion gases flowing through the catalytic converter from the burner only cool down a little before reaching the catalytic converter. The invention is based on the idea of using the hot combustion gases from the burner first for heating the catalytic converter in order to bring it as quickly as possible to its high operating temperature that is required for exhaust gas purification, and then to use said gases to heat the combustion engine and/or to heat the vehicle. Since the heating capacity of the catalytic converter is relatively low as compared with that of the combustion engine, noticeably quicker heating of the catalytic converter can be achieved in comparison to the arrangement from the prior art in accordance with DE 100 05 490 A1 without considerably reducing the heat supply to the combustion engine or to the heating system.

A preferred embodiment of the invention provides that the heat exchanger for heating the combustion engine be attached to said combustion engine's coolant circuit so that the coolant of the combustion engine after heating in the heat exchanger can be supplied directly to the coolant ducts or coolant spaces of the combustion engine in order to increase its temperature for reducing the pollutant emissions and fuel consumption before a cold start.

According to another preferred embodiment of the invention, the heat exchanger also forms a part of the auxiliary heater of the motor vehicle and for this purpose is expediently attached to a heating circuit of a heating system of the motor vehicle so that the heat of the hot combustion gases of the burner at low ambient temperatures before starting the vehicle, can be utilized to improve driving safety or increase comfort, in that windows, seats and/or the passenger compartment of the motor vehicle are heated with the auxiliary heater.

In the case of motor vehicles with hybrid propulsion, in which when operating an electric machine as driving propulsion, the quantity of heat adequate to heat the motor vehicle is not generated, the heat exchanger attached to the heating circuit can also form part of an additional heater, in which the required quantity of heat is generated by starting the burner during operation of the electric machine. If the burner is used at low ambient temperatures to generate heat during essentially the entire operating duration of the electric machine, the arrangement of the heat exchanger behind the catalytic converter also has the advantage that the catalytic converter is kept constantly at its optimal operating temperature so that exhaust gas limit values cannot be exceeded during the subsequent starting of the combustion engine. If no additional heating is required at high ambient temperatures, the burner can be activated expediently briefly before starting the combustion engine in order to heat up the catalytic converter beforehand.

Another preferred embodiment of the invention provides that the heat exchanger be attached to an absorption type refrigerating machine of an air conditioner of the motor vehicle. Firstly, this makes independent air conditioning of the vehicle possible at high ambient temperatures by starting the burner without a danger of draining the vehicle battery. Since hot exhaust gases from the combustion engine flow through the heat exchanger when the combustion engine is being operated, this measure also makes air conditioning the vehicle possible during vehicle operation without the higher fuel consumption or performance losses in the combustion engine that are caused by a conventional air conditioner. Secondly, the absorption type refrigerating machine can alternatively or additionally be used to cool an exhaust gas recirculation system of the combustion engine and/or to cool the charge air of a charge air cooler that is standard in turbocharged engines.

According to another preferred embodiment of the invention, the energy of the hot combustion gases of the burner in motor vehicles with turbochargers is used to propel an exhaust gas turbine of the turbocharger in order to avoid the so-called "turbo lag" in the combustion engine's lower rmp range. For this purpose, the exhaust gas turbine of the turbocharger is expediently arranged before the catalytic converter in the exhaust gas path of the combustion engine so that the hot combustion gases from the burner can be directed as needed throughout the exhaust gas turbine. In order to prevent the combustion gases from being directed through the exhaust gas turbine during a cold start, a bypass line is expediently provided through which the combustion gases can bypass the exhaust gas turbine.

BRIEF DESCRIPTION OF THE DRAWINGS

The invention is explained in more detail in the following in an exemplary embodiment on the basis of the associated drawings. They show.

DETAILED DESCRIPTION

Figure 1:
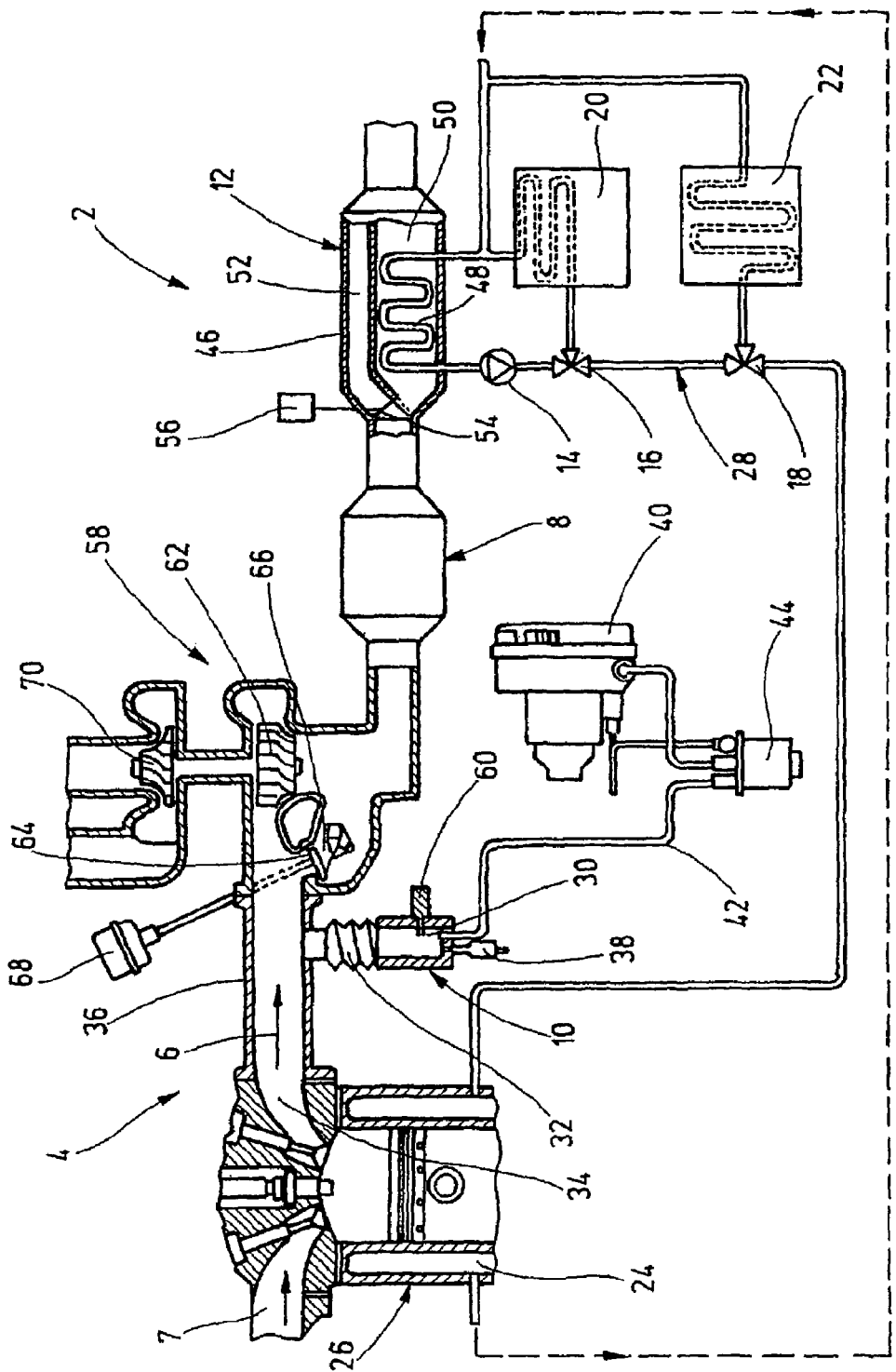
FIG. 1 A schematic depiction of a heating and/or cooling system for a motor vehicle in accordance with the invention FIG. 2 A schematic depiction of an absorption type refrigerating machine of an air conditioner of the motor vehicle, which forms a part of the heating and/or cooling system.

The heating and/or cooling system 2 of a motor vehicle depicted in the drawing with a combustion engine 4 (only shown partially) and a catalytic converter 8 arranged in the exhaust gas path 6 of the combustion engine 4 is comprised essentially of a burner 10 attached before the catalytic converter 8 to the exhaust gas path 6 and a heat exchanger 12 arranged after the catalytic converter 8 in the exhaust gas path 6, which heat exchanger along with an electric circulating pump 14, control valves 16 and 18, an absorption type refrigerating machine 20 of an air conditioner of the motor vehicle, a heating heat exchanger 22 of a heating system of the motor vehicle, as well as cooling ducts 24 in the cylinders 26 of the combustion engine 4 forms a heating and cooling circuit 28 through which coolant from said combustion engine flows.

The burner 10 is comprised essentially of a combustion chamber 30, which is attached via an exhaust gas line 32 embodied as bellows to an exhaust gas manifold 36 connected to outlet channels 34 of the combustion engine 4. The combustion chamber 30 can be acted upon with fuel as needed via an injection valve 38, which burns in the combustion chamber 30 with the supply of air. A blower 40 is provided to supply air to the combustion chamber 30 and this blower is connected to the combustion chamber 30 via a line 42 and a control valve 44.

The heat exchanger 12 is comprised essentially of an expanded exhaust gas pipe 46, which encloses a heat exchanger space 50 equipped with cooling ribs 48 (depicted as a cooling coil for the sake of simplicity) and a bypass channel 52. The heat exchanger space 50 and the bypass channel 52 can be connected optionally to the exhaust gas path 6 with the aid of an exhaust gas flap 54 and a control valve 56 that can be regulated. In this way, after passing through the catalytic converter 8, the exhaust gases from the combustion engine 4 or the combustion gases from the burner 10 can either pass through the heat exchange space 50 for heat exchange with the coolant in the heating and cooling circuit 28 or bypass the heat exchanger 12 through the bypass channel 52.

The combustion engine 4 features an exhaust gas turbocharger 58, which in the lower rpm range of the combustion engine 4 can also be driven by the hot combustion gases from the burner 10. For this purpose, fuel and air are briefly supplied to the combustion chamber 30 via the driver of the vehicle in the case of an acceleration requirement, and the fuel/air mixture is burned after ignition by means of an ignition aid 60. The hot combustion gases generated during combustion in the combustion chamber 30, like the exhaust gases of the combustion engine 4, are directed through an exhaust gas turbine 62 of the turbocharger 58 arranged in the exhaust gas path 6. To regulate the quantity of gas passing through the exhaust gas turbine 62, the exhaust gas manifold 36 is equipped with a control-device 66 in a bypass line 64 bypassing the exhaust gas turbine 62, and this control-device can be actuated by means of a final control element 68 that can be triggered electronically. Combustion gases from the burner 10 acting upon the exhaust gas turbine 62 can increase the rpm of a charging compressor 70 connected to the exhaust gas turbine 62 and as a result increase the charging pressure in the inlet channels 72 of the combustion engine 4 in the lower rpm range of the combustion engine 4, thereby avoiding the so-called turbo lag.

When the combustion engine 4 is at a standstill, the control-device 66 is open so that, when starting the burner 10 to heat the catalytic converter 8 and the combustion engine 4 and/or to heat the passenger compartment, the hot combustion gases generated in the combustion chamber 30 are directed through the exhaust gas line 32, the exhaust gas manifold 36 and the bypass line 64 directly to the catalytic converter 8 so that said catalytic converter can be heated to its optimal operating temperature in a short time before a cold start of the combustion engine 4 (or in the case of a hybrid engine after a longer period of operation of the electric machine) before the supply of the exhaust gases from the combustion engine.

The somewhat cooled combustion gases exiting from the catalytic converter 8 are supplied to the heat exchanger 12, where they are guided through the heat exchanger space 50 in the position of the exhaust gas flap 54 that is depicted in the drawing. In the process, the greatest part of the heat of the combustion gases is released to coolant of the combustion engine 4 directed in the counter flow through the cooling rips 48 in order to heat said coolant. The heated coolant is then supplied, with the aid of the control valves 16, 18, to the cooling ducts 24 of the combustion engine 4 and/or to the heating heat exchanger 22 in order to heat the combustion engine 4 or the passenger compartment before starting.

After starting the combustion engine 4, the exhaust gases of said combustion engine flow through the heat exchanger 12, thereby accelerating the heating of the coolant. The burner 10 can be shut off when starting the combustion engine 4 or still continue to be operated for a short time in order to provide for quicker heating of the passenger compartment if necessary. Once the desired temperature is reached there, the burner 10 can be shut off and the exhaust gas flap 54 can be closed completely or partially in order to direct the exhaust gases through the bypass channel 52.

Independent air conditioning of the passenger compartment is also possible at high ambient temperatures with the depicted heating and/or cooling system 2 in that ambient air is cooled in the absorption type refrigerating machine 20 before being supplied to the passenger compartment.

Figure 2:
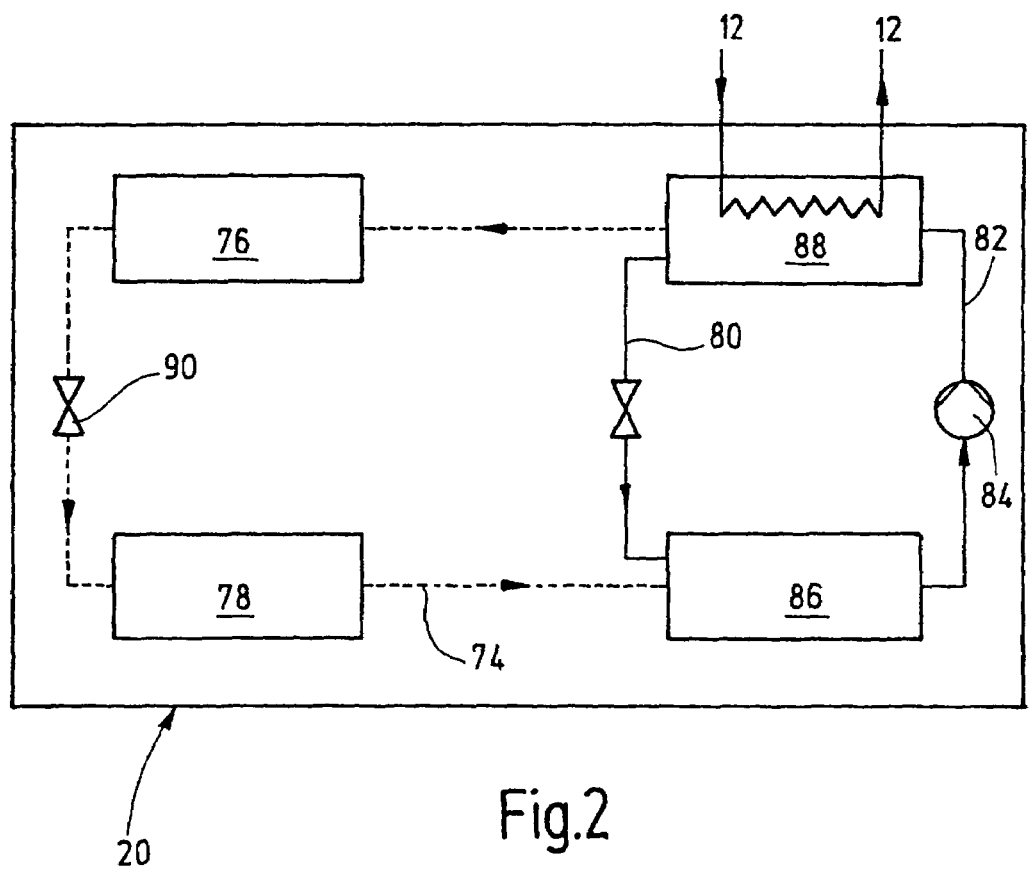

As depicted best in FIG. 2, the absorption type refrigerating machine 20 includes for this purpose a refrigerant branch 74 through which refrigerant flows with a condenser 76 and an evaporator 78, a solvent branch 80 through which solvent flows and a dual-substance branch 82 through which a solution of the refrigerant in solvent flows with a circulating pump 84. The three branches 74, 80 and 82 are all brought together in an absorber 86 and an expeller 88. In the absorber 86, the refrigerant is absorbed by the solvent and in the expeller 88 is separated from the solvent under the supply of energy. This takes place by the refrigerant-enriched solvent being heated, whereby the refrigerant evaporates and can be separated from carried along solvent residue with the aid of a liquid separator (not shown). Heated coolant of the combustion engine 4 supplied from the heat exchanger 12 to the expeller 88 is used to heat the enriched solvent.

The refrigerant is subsequently cooled in the condenser 76 and liquefied before it relaxes through a control valve 90 to the evaporative pressure and is evaporated in the evaporator 78. In this case, ambient air can be cooled in the evaporator 78 and be supplied to it for air conditioning the passenger compartment. After being separated from the refrigerant, the solvent is relaxed through a valve 92 to the pressure in the absorber 86, cooled and directed to the absorber 86, where it can again absorb the refrigerant supplied by the evaporator 78. The circulating pump 84 pumps the enriched solvent back to the expeller 88.

The invention claimed is:

1. Heating and/or cooling system for a motor vehicle with a combustion engine and a catalytic converter arranged in the exhaust gas path of the combustion engine, comprising a burner attached before the catalytic converter to the exhaust gas path of the combustion engine as well as a heat exchanger for transmitting heat generated in the burner to a heating and/or cooling circuit of the motor vehicle, characterized in that the heat exchanger (12) is arranged behind the catalytic converter (8) in the exhaust gas path (6) of the combustion engine (4) and can be acted upon through the catalytic converter (8) with hot combustion gases from the burner (10), characterized in that the heat exchanger (12) is attached to an absorption type refrigerating machine (20) of an air conditioner of the motor vehicle, and characterized in that the absorption type refrigerating machine is configured to cool an exhaust gas recirculation system or exhaust gas recirculation line of the combustion engine.

2. Heating and/or cooling system according to claim 1, characterized by a closeable bypass line (52) before and after the heat exchanger (12) discharging into the exhaust gas path (6).

3. Heating and/or cooling system according to claim 2, characterized by a controllable flap valve (54) in the bypass line (52).

4. Heating and/or cooling system according to claim 2, characterized in that the bypass line (52) and the heat exchanger (12) are enclosed by an expanded exhaust gas pipe (46).

5. Heating and/or cooling system according to claim 1, characterized in that the heat exchanger (12) is attached to a coolant circuit (28) of the combustion engine (4).

6. Heating and/or cooling system according to claim 1, characterized in that the heat exchanger (12) is attached to a heating circuit of a heating system of the motor vehicle.

7. Heating and/or cooling system according to claim 1, characterized in that the heat exchanger is attached to an expeller (88) of the absorption type refrigerating machine (20) so that the expeller is acted upon with the engine coolant heated in the heat exchanger (12).

8. Heating and/or cooling system for a motor vehicle with a combustion engine and a catalytic converter arranged in the exhaust gas path of the combustion engine, comprising a burner attached before the catalytic converter to the exhaust gas path of the combustion engine as well as a heat exchanger for transmitting heat generated in the burner to a heating and/or cooling circuit of the motor vehicle, characterized in that the heat exchanger (12) is arranged behind the catalytic converter (8) in the exhaust gas path (6) of the combustion engine (4) and can be acted upon through the catalytic converter (8) with hot combustion gases from the burner (10), characterized in that the heat exchanger (12) is attached to an absorption type refrigerating machine (20) of an air conditioner of the motor vehicle, and characterized in that the absorption type refrigerating machine is configured to cool the charge air of a turbocharger (58) of the combustion engine.

9. Heating and/or cooling system according to claim 8, characterized in that an exhaust gas turbine (62) of the turbocharger (58) of the combustion engine arranged before the catalytic converter (8) in the exhaust gas path (6) can be acted upon with hot combustion gases from the burner (10).

10. Heating and/or cooling system according to claim 9, characterized by a bypass line (64) that is closeable via a control-device (66) and that bypasses the exhaust gas turbine (62).

11. Heating ad/or cooling system according to claim 8, characterized by a closeable bypass line (52) before and after the heat exchanger (12) discharging into the exhaust gas path (6).

12. Heating and/or cooling system according to claim 8, characterized in that the heat exchanger (12) is attached to a coolant circuit (28) of the combustion engine (4).

13. Heating and/or cooling system according to claim 8, characterized in that the heat exchanger (12) is attached to a heating circuit of a heating system of the motor vehicle.

14. Heating and/or cooling system for a motor vehicle with a combustion engine and a catalytic converter arranged in the exhaust gas path of the combustion engine, comprising a burner attached before the catalytic converter to the exhaust gas path of the combustion engine as well as a heat exchanger for transmitting heat generated in the burner to a heating and/or cooling circuit of the motor vehicle, characterized in that the heat exchanger (12) is arranged behind the catalytic converter (8) in the exhaust gas path (6) of the combustion engine (4) and can be acted upon through the catalytic converter (8) with hot combustion gases from the burner (10), characterized by a closeable bypass line (52) before and after the heat exchanger (12) discharging into the exhaust gas path (6), characterized by a controllable flap valve (54) in the bypass line (52), characterized in that the bypass line (52) and the heat exchanger (12) are enclosed by an expanded exhaust gas pipe (46), characterized in that the heat exchanger (12) is attached to a coolant circuit (28) of the combustion engine (4), characterized in that the heat exchanger (12) is attached to a heating circuit of a heating system of the motor vehicle, characterized in that the heat exchanger (12) is attached to an absorption type refrigerating machine (20) of an air conditioner of the motor vehicle, characterized in that the heat exchanger is attached to an expeller (88) of the absorption type refrigerating machine (20) so that the expeller is acted upon with the engine coolant heated in the heat exchanger (12), and characterized in that the absorption type refrigerating machine is configured to cool an exhaust gas recirculation system or exhaust gas recirculation line of the combustion engine.

15. Heating and/or cooling system according to claim 14, characterized in that the absorption type refrigerating machine is configured to cool the charge air of the turbocharger (58) of the combustion engine.

16. Heating and/or cooling system according to claim 15, characterized in that an exhaust gas turbine (62) of a turbocharger (58) of the combustion engine arranged before the catalytic converter (8) in the exhaust gas path (6) can be acted upon with hot combustion gases from the burner (10).

17. Heating and/or cooling system according to claim 16, characterized by a bypass line (64) that is closeable via a control-device (66) and that bypasses the exhaust gas turbine (62).

* * * * *

UNITED STATES PATENT AND TRADEMARK OFFICE
CERTIFICATE OF CORRECTION

PATENT NO.       : 7,654,312 B2                                             Page 1 of 1
APPLICATION NO. : 11/302816
DATED            : February 2, 2010
INVENTOR(S)      : Baeuerle et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1084 days.

Signed and Sealed this

Twenty-third Day of November, 2010

David J. Kappos
*Director of the United States Patent and Trademark Office*